United States Patent
He et al.

(10) Patent No.: US 10,503,555 B2
(45) Date of Patent: Dec. 10, 2019

(54) SELECTING TYPE AND QUANTITY OF APPLICATION MASTERS THAT NEED TO BE STARTED IN ADVANCE

(71) Applicant: Huawei Technologies Co., Ltd., Shenzhen, Guangdong (CN)

(72) Inventors: Guangwu He, Shenzhen (CN); Junhua Zhu, Hangzhou (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 549 days.

(21) Appl. No.: 15/208,510

(22) Filed: Jul. 12, 2016

(65) Prior Publication Data

US 2016/0321109 A1 Nov. 3, 2016

Related U.S. Application Data

(63) Continuation of application No. PCT/CN2014/094747, filed on Dec. 24, 2014.

(30) Foreign Application Priority Data

Jan. 13, 2014 (CN) .......................... 2014 1 0014515

(51) Int. Cl.
*G06F 9/46* (2006.01)
*G06F 9/50* (2006.01)
*H04L 29/08* (2006.01)

(52) U.S. Cl.
CPC ........ *G06F 9/5027* (2013.01); *H04L 67/1008* (2013.01)

(58) Field of Classification Search
None
See application file for complete search history.

(56) References Cited

U.S. PATENT DOCUMENTS 8,706,798 B1 * 4/2014 Suchter ................. G06F 9/5038
709/202
9,674,249 B1 * 6/2017 Kekre ..................... H04L 65/60
(Continued)

FOREIGN PATENT DOCUMENTS

CN 103246570 A 8/2013
CN 103500119 A 1/2014

OTHER PUBLICATIONS

Cheng et al.; "New Mechanism of Monitoring on Hadoop Cloud Platform"; Computer Science; vol. 40 No. 1; Jan. 2013; 6 pages.
(Continued)

*Primary Examiner* — Wissam Rashid
(74) *Attorney, Agent, or Firm* — Womble Bond Dickinson (US) LLP (57) ABSTRACT

A resource management method and apparatus are provided. The resource management method includes: selecting, by a resource manager RM, according to a type and a quantity of application masters AMs that need to be started in advance, resources from resources registered by a node manager, encapsulating the resources into multiple containers matching the AMs, and starting the AMs in the matching containers; and when the RM receives a job submitted by a client, checking, in the AMs according to information about the job, whether there is a matching AM to be used to execute the job, and if there is a matching AM, submitting the job to the matching AM for execution. Such that, when a client submits a job, the job can be submitted to an AM that has been started in advance for execution, thereby reducing latency resulting from resource allocation and AM startup.

14 Claims, 7 Drawing Sheets

(56) References Cited

U.S. PATENT DOCUMENTS

| | | | |
|---|---|---|---|
| 2005/0027785 A1* | 2/2005 | Bozak | G06F 9/5072 709/200 |
| 2006/0143495 A1 | 6/2006 | Bozak et al. | |
| 2007/0226743 A1 | 9/2007 | Takahashi | |
| 2013/0104140 A1 | 4/2013 | Meng et al. | |
| 2015/0193090 A1* | 7/2015 | Grover | G06F 9/445 715/745 |

OTHER PUBLICATIONS

Chen et al.; "Research Based on Hadoop Job Scheduling Strategy"; Computer Knowledge and Technology; vol. 8 No. 19; Jul. 2012; 4 pages.

Chris Harris, "Apache Hadoop YARN and Tez, Future of Data Processing with Hadoop", Hortonworks, 2013, 31 pages.

Carlo Curino et al., "Reservation-based Scheduling: If You're Late Don't Blame Us!" (Microsoft Tech-Report: MSR-TR-Aug. 2013), Oct. 28, 2013, 20 pages.

"MR AM should reuse containers for map tasks, there-by allowing fine-grained control on num-maps for users without need for for CombineFileInputFormat etc.", Hadoop Map/Reduce, Feb. 23, 2012, 5 pages.

"Allow an AM to reuse the resources allocated to container for a new container", Hadoop YARN, Feb. 2, 2013, 2 pages.

"Hortonworks Data Platform 2.0, Installing HDP Manually", Mar. 18, 2013, 60 pages.

Hadoop, MapReduce, Pig, Hive, and Big Data stuff:"YARN: MapReduce 2, How does YARN overcomes shortcomings of "classic" MapReduce", Friday, Dec. 27, 2013. Retrieved from the internet: http://dailyhadoopsoup.blogspot.com/2013/12/how-does-yarn-overcomes-shortcomings-of.html. total 3 pages. XP002794237.

* cited by examiner

Prior art

FIG. 1

| A resource manager RM selects, according to a type and a quantity of application masters AMs that need to be started in advance, resources from resources registered by a node manager NM, encapsulates the resources into multiple containers Containers matching the AMs that need to be started in advance, and starts the AMs that need to be started in advance in the matching Containers | 201 |
|---|---|
| When receiving a job submitted by a client, the RM checks, in the AMs that have been started in advance and according to information about the job, whether there is a matching AM to be used to execute the job, and if there is a matching AM to be used to execute the job, submits the job to the matching AM for execution | 202 |

SELECTING TYPE AND QUANTITY OF APPLICATION MASTERS THAT NEED TO BE STARTED IN ADVANCE

CROSS-REFERENCE TO RELATED APPLICATIONS

This application is a continuation of International Application No. PCT/CN2014/094747, filed on Dec. 24, 2014, which claims priority to Chinese Patent Application No. 201410014515.7, filed on Jan. 13, 2014, both of which are hereby incorporated by reference in their entireties.

TECHNICAL FIELD

Embodiments of the present disclosure relate to network technologies, and in particular, to a resource management method and apparatus.

BACKGROUND

The distributed system framework Hadoop is an extensible open-source project developed by Apache for distributed storage and computing, in a Hadoop yarn system framework, resource management, and job scheduling and monitoring are separated into two components. Different application masters (AM) enable different applications to run in the framework, and a resource manager (RM) encapsulates resources into containers that can be scheduled for different applications and tasks. This greatly improves resource utilization.

Figure 1:
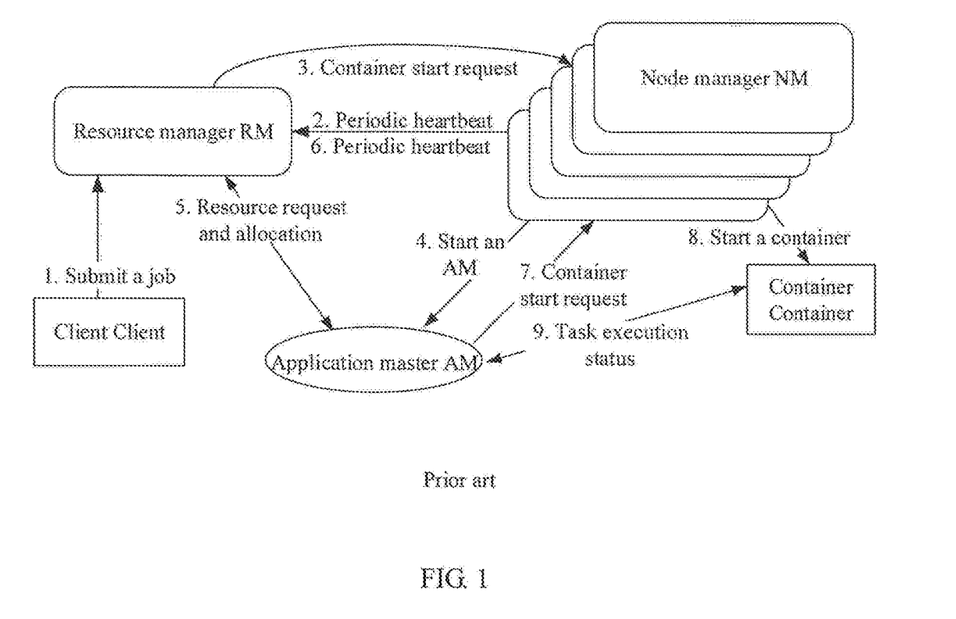
FIG. 1 is a system architecture diagram of Hadoop YARN in the prior art.

FIG. 1 is a system architecture diagram of Hadoop YARN in the prior art. As shown in FIG. 1, network elements included in the system architecture and their functions are as follows: A resource manager RM is configured for resource management and application management, allocating resources to running applications according to a capacity, a queue, or other constraints; a node manager (NM) serves as a framework agent on each node, and is responsible for starting a container required by an application, monitoring resource statuses, and reporting the statuses to the RM; an application master AM is configured to manage an application program corresponding to the AM, acquire proper containers from the RM for task execution, and track statuses and progress of these containers, where the container refers to an encapsulated machine resource (CRU, memory, or the like) and the resource encapsulated in the container is used for task execution; and a client is configured to submit a job and query an execution status. First, the client submits a job, the resource manager allocates, according to resources registered by the node manager, an encapsulated resource, namely, a container to the job and starts an AM for the job, and then the AM requests the encapsulated resource from the RM and starts the container to execute a task of the job.

A problem in the prior art is that, each time a client submits a job, the client needs to request a resource from an RM dynamically and starts an independent AM, resulting in increased latency for starting the job, which brings great impact on some jobs (such as small jobs and real-time jobs).

SUMMARY

Embodiments of the present disclosure provide a resource management method and apparatus, so as to resolve the prior-art problem of relatively long latency resulting from the need to request a resource from an RM dynamically and start an AM when a job is submitted.

According to a first aspect, an embodiment of the present disclosure provides a resource management method, including:

selecting, by a resource manager RM, according to a type and a quantity of application masters AMs that need to be started in advance, resources from resources registered by a node manager NM, encapsulating the resources into multiple containers matching the AMs that need to be started in advance, and starting the AMs that need to be started in advance in the matching containers; and when the RM receives a job submitted by a client, checking, in the AMs that have been started in advance and according to information about the job, whether there is a matching AM to be used to execute the job, and if there is a matching AM to be used to execute the job, submitting the job to the matching AM for execution.

With reference to the first aspect, in a first possible implementation manner of the first aspect, after the submitting the job to the matching AM for execution, the method further includes:

receiving, by the RM, a resource request from the matching AM, allocating a resource registered by the NM, encapsulating the resource into a container, and executing a task of the job in the encapsulated container.

With reference to the first aspect, or the first possible implementation manner of the first, aspect, in a second possible implementation manner of the first aspect, before the RM receives the job submitted by the client, the method further includes:

reserving, by the RM, resources and encapsulating the reserved, resources into multiple containers, where the checking, by the RM, in the AMs that have been started in advance and according to information, about the job, whether there is a matching AM to be used to execute the job, and if there is a matching AM to be used to execute the job, submitting the job to the matching AM for execution is:

checking, by the RM, in the AMs that have been started in advance and according to the information about the job, whether there is a matching AM to be used to execute the job, if there is no matching AM to be used to execute the job, determining, according to the information about the job, whether there is a matching container of a reserved resource, to be used for starting a new AM to execute the job, and if there is a matching container of a reserved resource to be used for starting a new AM to execute the job, allocating the matching container of the reserved resource to start a new AM to execute the job; or if there is a matching AM to be used to execute the job, checking, according to the information about the job, whether there is a matching container of a reserved resource to be used for the matching AM to execute a task of the job, and if there is a matching container of a reserved resource to be used for the matching AM to execute the task of the job, allocating the matching container of the reserved resource to the AM for executing the task of the job.

With reference to the first aspect, in a third possible implementation manner of the first aspect, the checking, in the AMs that have been started in advance, whether there is a matching AM to be used to execute the job, and if there is a matching AM to be used to execute the job, submitting the job to the matching AM for execution includes:

if the information about the job includes executing the job on a designated AM, determining whether the designated AM meets a condition for executing the job, and if the designated AM meets the condition for executing the job, submitting the job to the AM that meets the condition for execution; or if the information about the job includes executing the job on an AM of a designated application type, determining whether there is an AM that meets a condition in AMs corresponding to the application type, to be used to execute the job, and if there is an AM that meets the condition in AMs corresponding to the application type, submitting the job to the AM that meets the condition for execution; or if the information about the job includes application information of the job, determining, according to the application information, whether there is a matching AM application type, if there is a matching AM application type, checking whether there is an AM that meets a condition in AMs corresponding to the application type, to be used to execute the job, and if there is an AM that meets the condition in AMs corresponding to the application type, submitting the job to the AM that meets the condition for execution.

With reference to the first aspect, in a fourth possible implementation manner of the first aspect, the method further includes:

recording, by the RM, information about the AMs that need to be started in advance, where the information includes host names, IP addresses, port numbers, application types and statuses of the AMs that need to be started in advance; and checking, by the RM, whether the AMs that need to be started in advance are in a normal state, and if there is an AM in an abnormal state, reallocating a resource to start the AM that has failed.

With reference to the second possible implementation manner of the first aspect, in a fifth possible implementation manner of the first aspect, the method further includes:

according to a received resource modification request, increasing or decreasing, by the RM, the AMs that need to be started in advance; or modifying information about the AMs that need to be started in advance, including modifying resources for starting the AMs that need to be started in advance; or increasing or decreasing the reserved resources.

With reference to any one of the first to fifth possible implementation manners of the first aspect, in a sixth possible implementation manner of the first aspect, after the container completes execution of the task of the job, the method further includes:

determining whether the container that executes the task of the job needs to be serve as a container of a reserved source; and if the container that executes the task of the job needs to be serve as a container of a reserved source, adding the container that executes the task of the job to the reserved resources; or if the container that executes the task of the job does not need to be serve as a container of a reserved source, removing the container that executes the task of the job and releasing the resource.

According to a second aspect, an embodiment of the present disclosure provides a resource manager, including:

a management module, configured to: select, according to a type and a quantity of application masters AMs that need to be started in advance, resources from resources registered by a node manager NM, encapsulate the resources into multiple containers matching the AMs that need to be started in advance, and start the AMs that need to be started in advance in the matching containers; and a check and submission module, configured to: when a job submitted by a client is received, check, in the AMs that have been started in advance and according to information about the job, whether there is a matching AM to be used to execute the job, and if there is a matching AM to be used to execute the job, submit the job to the matching AM for execution.

With reference to the second aspect, in a first possible implementation manner of the second aspect, the resource manager further includes:

a receiving module, configured to: after the check and submission module submits the job to the matching AM for execution, receive a resource request from the matching AM; where correspondingly, the management module is further configured to:

allocate a resource registered by the NM, encapsulate the resource into a container, and execute a task of the job in the encapsulated container.

With reference to the second aspect, or the first possible implementation manner of the second aspect, in a second possible implementation manner of the second aspect, the management module is further configured to:

before, the job submitted by the client is received, reserve resources and encapsulate the reserved resources into multiple containers; and correspondingly, the check and submission module is configured to:

check, in the AMs that have been started in advance and according to the information about the job, whether there is a matching AM to be used to execute the job, and if there is no matching AM to be used to execute the job, determine, according to the information about the job, whether there is a matching container of a reserved resource to be used for starting a new AM to execute the job, where if there is a matching container of a reserved resource to be used for starting a new AM to execute the job, the management module is further configured to allocate the matching container of the reserved resource to start a new AM to execute the job; and if there is a matching AM to be used to execute the job, check, according to the information about the job, whether there is a matching container of a reserved resource to be used for the matching AM to execute a task of the job, where if there is a matching container of a reserved resource to be used for the matching AM to execute the task of the job, the management module is further configured to allocate the matching container of the reserved resource to the AM for executing the task of the job.

With reference to the second aspect, in a third possible implementation manner of the second aspect, the check and submission module is configured to:

if the information about the job includes executing the job on a designated AM, determine whether the designated AM meets a condition for executing the job, and if the designated AM meets the condition for executing the job, submit the job to the AM that meets the condition for execution; or if the information about the job includes executing the job on an AM of a designated application type, determine whether there is an AM that meets a condition in AMs corresponding to the application type, to be used to execute the job, and if there is an AM that meets the condition in AMs corresponding to the application type, submit the job to the AM that meets the condition for execution; or if the information about the job includes application information of the job, determine, according to the application information, whether there is a matching AM application type, if there is a matching AM application type, check whether there is an AM that meets a condition in AMs corresponding to the application type, to be used to execute the job, and if there is an AM that meets the condition in AMs corresponding to the application type, submit the job to the AM that meets the condition for execution.

With reference to the second aspect, in a fourth possible implementation manner of the second aspect, the management module is further configured to:

record information about the AMs that need to be started in advance, where the information includes hose names, IP addresses, port numbers, application types and statuses of the AMs that need to be started in advance; and the check and submission module is further configured to check whether the AMs that need to be started in advance are in a normal state, where if there is an AM in an abnormal state, the management module is further configured to re-allocate a resource to start the AM that has failed.

With reference to the second possible implementation manner of the second aspect, in a fifth possible implementation manner of the second aspect, the management module is further configured to:

according to a received resource modification request, increase or decrease the AMs that need to be started in advance; or modify information about the AMs that need to be started in advance, including modifying resources for starting the AMs that need to be started in advance; or increase or decrease the reserved resources.

With reference to any one of the first to fifth possible implementation manners of the second aspect, in a sixth possible implementation manner of the second aspect, the management module is further configured to:

after the container completes execution of the task of the job, determine whether the container that executes the task of the job needs to be serve as a container of a reserved source; and if the container that executes the task of the job needs to be serve as a container of a reserved source, add the container that executes the task of the job to the reserved resources; or if the container that executes the task of the job does not need to be serve as a container of a reserved source, remove the container that executes the task of the job and release the resource.

According to the resource management method and apparatus in the embodiments of the present disclosure, a resource manager RM selects, according to a type and a quantity of application master AMs that need to be started in advance, resources from resources registered by a node manager NM, encapsulates the resources into multiple containers matching the AMs that need to be started in advance, and starts the AMs in the containers. The RM receives a job submitted by a client, checks, in the multiple AMs that have been started in advance and according to information about the job, whether there is a matching AM to be used to execute the job, and if there is a matching AM to be used to execute the job, submits the job to the matching AM for execution. It is implemented that, when a client submits a job, the job can be submitted to an AM that has been started in advance for execution, thereby reducing latency resulting from resource allocation and AM startup, and resolving the prior-art problem of relatively long latency resulting from the need to request a resource from an RM dynamically and start an AM when a job is submitted.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. The accompanying drawings in the following description show some embodiments of the present disclosure, and persons of ordinary skill in the art may still derive other drawings from these accompanying drawings without creative efforts.

DETAILED DESCRIPTION

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 2:
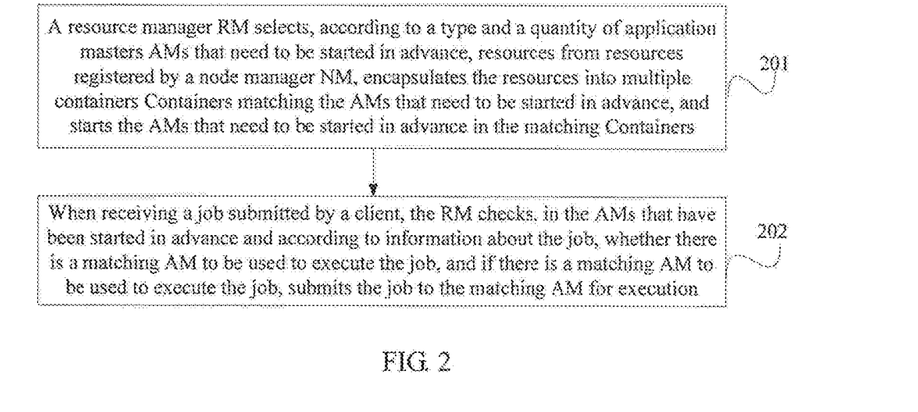
FIG. 2 is a flowchart of Embodiment 1 of a resource management method according to the present disclosure.
Figure 3:
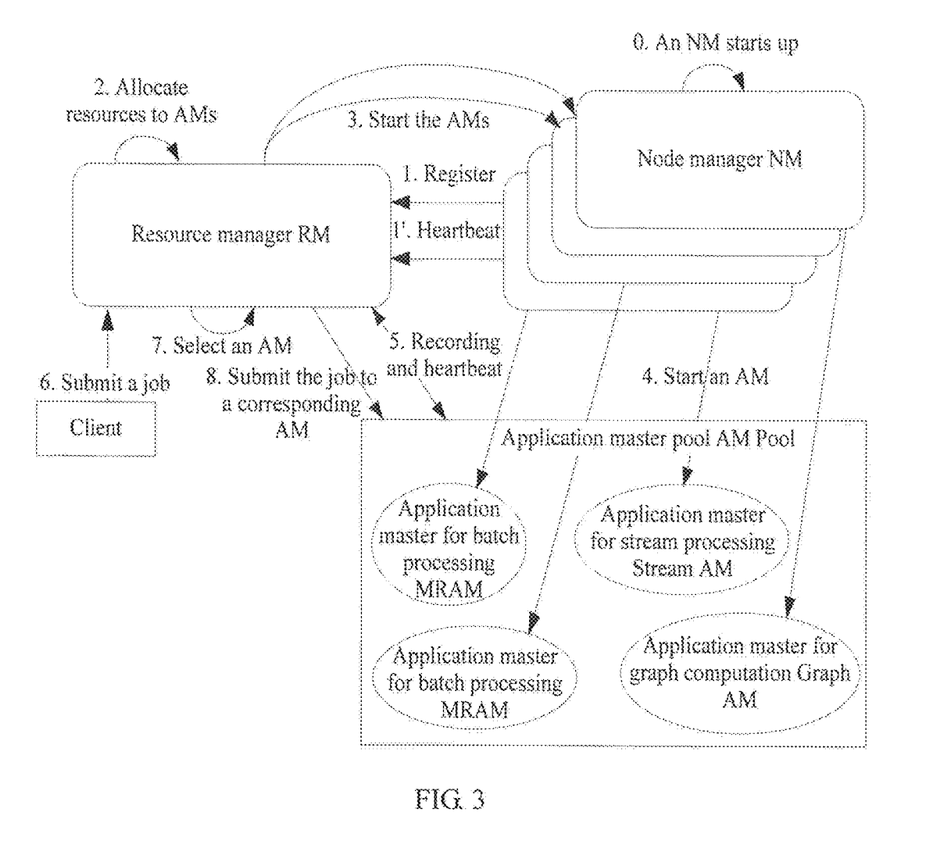
FIG. 3 is a system architecture diagram of Embodiment 1 of the resource management method according to the present disclosure.

FIG. 2 is a flowchart of Embodiment 1 of a resource management method according to the present disclosure. FIG. 3 is a system architecture diagram of Embodiment 1 of the resource management method according to the present disclosure. This embodiment is executed by a resource manager RM, and the RM may be implemented by means of software and/or hardware. The solution of this embodiment is applied to a Hadoop extensible system framework for distributed storage and computing. As shown in FIG. 2, the method of this embodiment includes:

Step 201: A resource manager RM encapsulates, according to a type and a quantity of application masters AMs that need to be started in advance, resources that are registered by a node manager NM into multiple containers matching the AMs that need to be started in advance, and starts the AMs that need to be started in advance in the matching containers.

As shown in FIG. 3, a list of AMs that need to be started in advance may be stored in the RM, where the list includes a type and a quantity of the AMs that need to be started in advance. After completion of resource registration by the NM, the RM configures the type and the quantity of the AMs that need to be started in advance on the NM, according to configuration information (for example, the list of AMs that have been started in advance) and statuses of available resources of the NM, encapsulates the available resources in the resources registered by the NM into multiple containers matching the AMs that need to be started in advance, and starts the AMs in the containers. These multiple AMs that need to be started in advance form an application master pool AM Pool (which includes, for example, an application master for batch processing MapReduce (MR) AM, an application master for stream processing Stream AM, and an application master for graph computing Graph AM). After the AMs are started, their related information is registered in the RM.

Step 202: When receiving a job submitted by a client, the RM checks, in the AMs that have been started in advance and according to information about the job, whether there is a matching AM to be used to execute the job, and if there is a matching AM to be used to execute the job, submits the job to the matching AM for execution.

As shown in FIG. 3, the RM receives the job submitted by the client, checks, in the multiple AMs that have been started in advance and according to the information about the job, whether there is a matching AM to be used to execute the job. If there is a matching AM to be used to execute the job, the RM submits the job to the matching AM for execution; if there is no matching AM to be used to execute the job, the RM allocates a resource to start a new AM to execute the job. After the multiple AMs that have been started in advance complete job execution, a newly submitted job can still be submitted to a matching AM, which implements reuse of resources and reduces latency for AM startup.

Optionally, after the job is submitted to the matching AM for execution, the method of this embodiment may further include:

receiving, by the RM, a resource request from the matching AM, allocating a resource registered by the NM, encapsulating the resource, into a container, and executing a task of the job in the encapsulated container.

Optionally, the RM records information about the AMs that need co be started in advance, where the information includes host names, IP addresses, port numbers, application types and statuses of the AMs that need to be started, in advance; and the RM checks whether the AMs that need to be started in advance are in a normal state, and if there is an AM in an abnormal state, re-allocates a resource to start the AM that has failed.

The RM may record the information about the AMs that need to be started in advance, where the information includes the host names, IP addresses, port numbers, application types, and statuses of the AMs, so that the client searches, after submitting the job, for a corresponding AM to execute the job. In addition, the RM periodically checks the statuses of the AMs that have been started in advance, for example, by determining whether a heartbeat between the RM and the AM is normal (for example, a heartbeat interval is specified to be within a time range, and exceeding the range indicates an abnormal heartbeat). When the RM finds that some AMs are faulty, the RM re-allocates resources for these AMs, and determines whether there are adequate resources to start the AMs. If there are adequate resources, the RM allocates resources and starts the AMs, records information about the AMs, and continues to check statuses of the AMs periodically.

In this embodiment, a resource manager RM selects, according to a type and a quantity of application masters AMs that need to be started in advance, resources from resources registered by a node manager NM, encapsulates the resources into multiple containers matching the AMs that need to be started in advance, and starts the AMs in the matching containers. When receiving a job submitted by a client, the RM checks, in the AMs that have been started in advance and according to information about the job, whether there is a matching AM to be used to execute the job, and if there is a matching AM to be used to execute the job, submits the job to the matching AM for execution. It is implemented that, when a client submits a job, the job can be submitted to an AM that has been started in advance for execution, thereby reducing latency resulting from resource allocation and AM startup, and resolving the prior-art problem of relatively long latency resulting from the need to request a resource from an RM dynamically and start an AM when a job is submitted.

Figure 4:
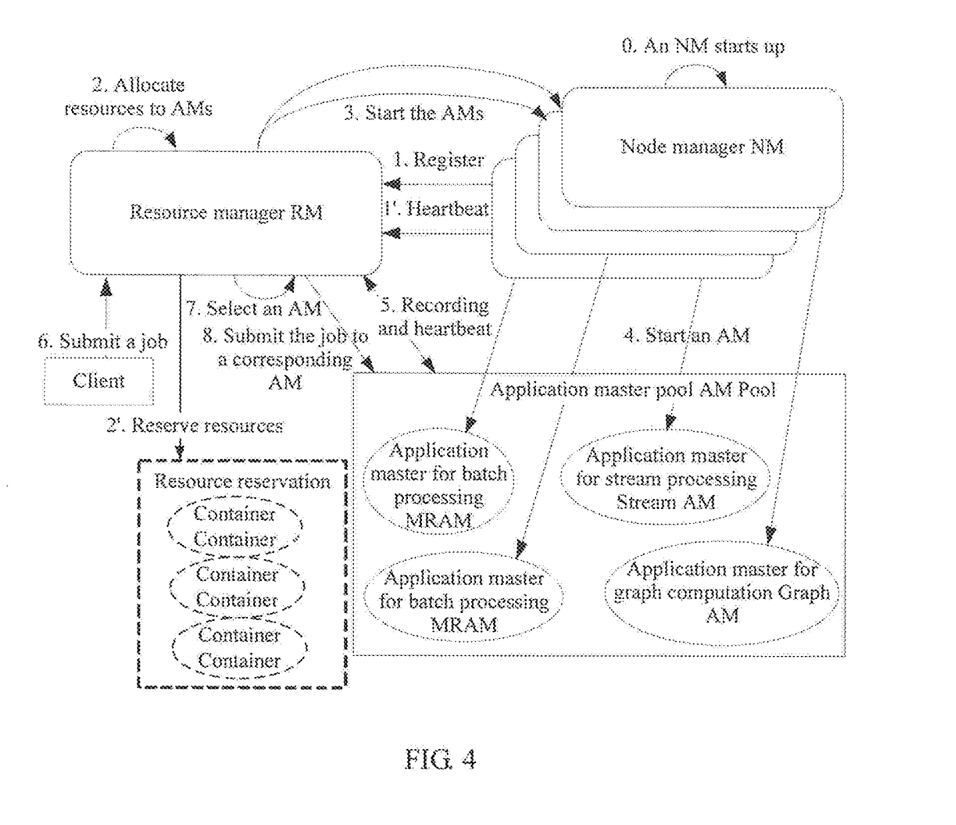
FIG. 4 is a system architecture diagram of Embodiment 2 of the resource management method according to the present disclosure.
Figure 5:
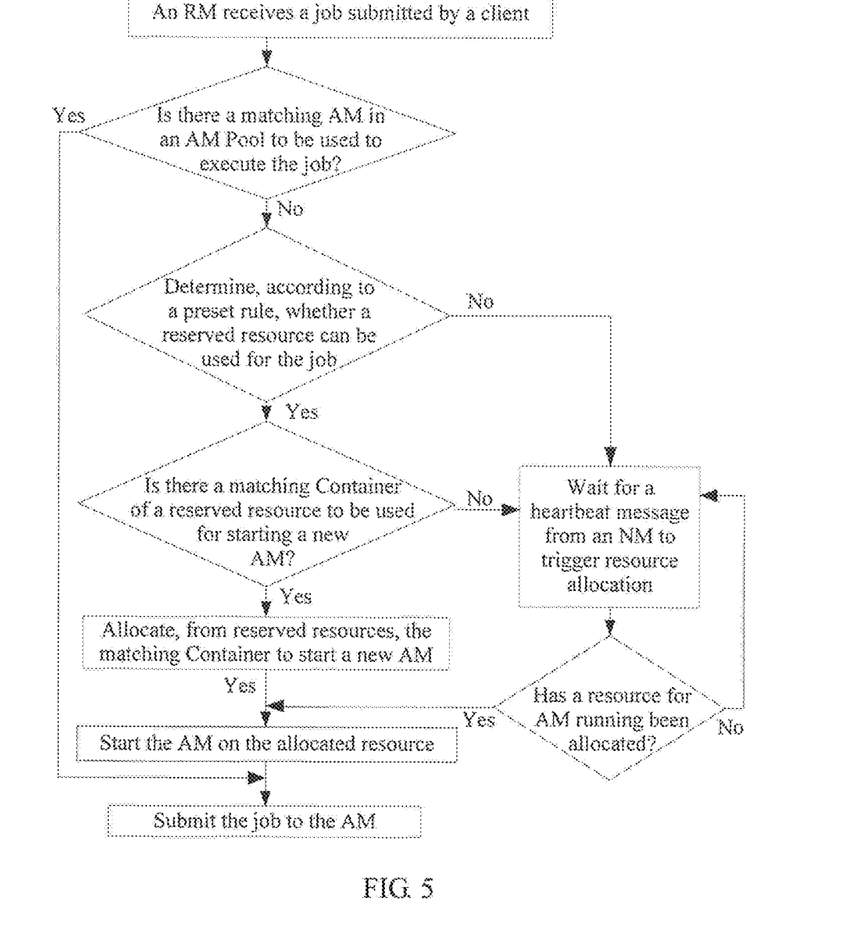
FIG. 5 is flowchart 1 of Embodiment 2 of the resource management method according to the present disclosure.
Figure 6:
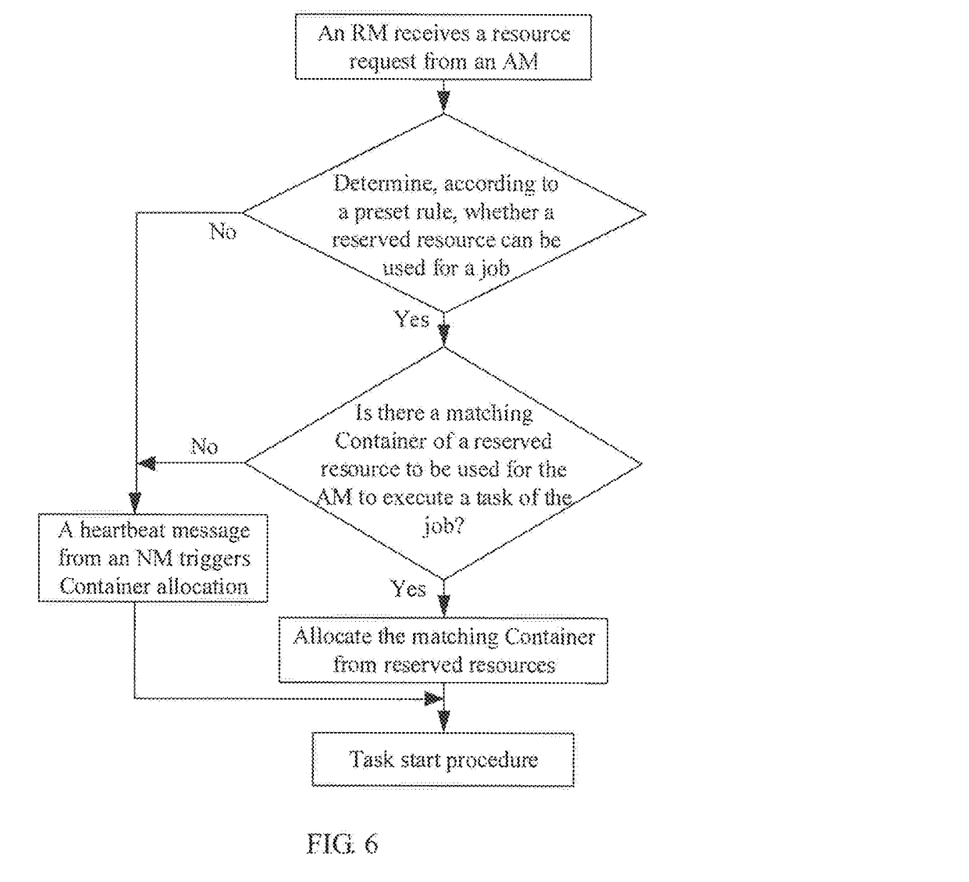
FIG. 6 is flowchart 2 of Embodiment 2 of the resource management method according to the present disclosure.

FIG. 4 is a system architecture diagram of Embodiment 2 of the resource management method according to the present disclosure. FIG. 5 is flowchart 1 of Embodiment 2 of the resource management method according to the present disclosure. FIG. 6 is flowchart 2 of Embodiment 2 of the resource management method according to the present disclosure. As shown in FIG. 4, before the RM receives the job submitted by the client, the method in this embodiment may further include:

reserving, by the RM, resources and encapsulating the reserved resources into multiple containers, where that the RM checks, in the AMs that have been started in advance and according to information about the job, whether there is a matching AM to be used to execute the job, and if there is a matching AM to be used to execute the job, submits the job to the matching AM for execution is:

checking, by the RM, in the AMs that have been started in advance and according to the information about the job, whether there is a matching AM to be used to execute the job, if there is no matching AM to be used to execute the job, determining, according to the information about the job, whether there is a matching container of a reserved resource to be used for starting a new AM to execute the job, and if there is a matching container of a reserved resource to be used for starting a new AM to execute the job, allocating the matching container of the reserved resource to start a new AM to execute the job; or if there is a matching AM to be used to execute the job, checking, according to the information about the job, whether there is a matching container of a reserved resource to be used for the matching AM to execute a task of the job, and if there is a matching container of a reserved resource to be used for the matching AM to execute the task of the job, allocating the matching container of the reserved resource to the AM for executing the task of the job.

After the client submits the job, when there is no AM that meets a condition in the AM Pool in which the multiple AMs that have been started in advance are located, to be used to execute the job, a resource needs to be allocated to start, a new AM, which results in latency. In addition, for some small jobs (a small job is, for example, a job that is executed within a relatively short time or that occupies relatively few resources), resource allocation for task execution also results in latency. To reduce the latency resulting from resource allocation, as shown in FIG. 4, the RM further uses the way of reserving resources. After startup, the RM selects some reserved resources according to information such as system configuration, for use in scenarios requiring relatively high real-time performance, such as an AM running scenario or a small task scenario, and encapsulates the reserved resources into multiple containers. After the resources are reserved, the RM saves information about, the reserved resources, including descriptions (memory, CPU, IO and like information) of the resources, locations of the resources, and the like. As shown in FIG. 5, the RM receives the job submitted by the client, and checks, according to the information about the job, whether there is a matching AM in the AM Pool to be used to execute the job. If there is no matching AM to be used to execute the job, the RM checks, according to the information about the job, whether there is a matching container of a reserved resource to be used for starting a new AM to execute the job. If there is a matching container of a reserved resource to be used for starting a new AM to execute the job, the RM allocates, from the reserved resources, the matching container to start a new AM, and submits the job to the AM for execution after the AM is started. If there is no matching container of a reserved resource to be used for starting a new AM to execute the job, the RM waits for a heartbeat message from the NM to trigger resource allocation, and the RM allocates a resource to start an AM corresponding to the job. Before checking whether there is a matching container of a reserved resource to be used for starting a new AM to execute the job, the RM may further determine, according to a preset rule, whether a reserved resource can be used for the job. For example, reserved resources are generally used in scenarios requiring relatively high real-time, performance, such as a small job scenario. As shown in FIG. 6, if there is a matching AM to be used to execute the job, the job is submitted to the matching AM for execution. The AM requests a resource from the RM to execute the task of the job. The RM receives the resource request, and checks, according to the information about the job, whether there is a matching container of a reserved resource to be used for the AM to execute the task of the job. If there is a matching container of a reserved resource to be used for the AM to execute the task of the job, the RM allocates the matching container from the reserved resources to the AM for executing the task of the job, where the task of the job is started after the allocation is complete. If there is no matching container of a reserved resource to be used for the AM to execute the task of the job, the RM waits for a heartbeat message from the NM to trigger container allocation. Similarly, before checking whether there is a matching container of a reserved resource to be used for the AM to execute the task of the job, the RM may further determine, according to a preset rule, whether a reserved resource can be used to execute the task of the job.

In this embodiment, an RM reserves resources and encapsulates the reserved resources into containers. When there is no corresponding AM in an AM Pool or all corresponding AMs in the AM Pool have jobs to execute, an AM corresponding to a job is started in a container obtained by encapsulating a reserved resource; or when an AM requests a resource from the RM to execute a task of a job, a container obtained by encapsulating a reserved resource is allocated to the AM for executing the task of the job. In this way, latency resulting from resource allocation and container startup is reduced.

Figure 7:
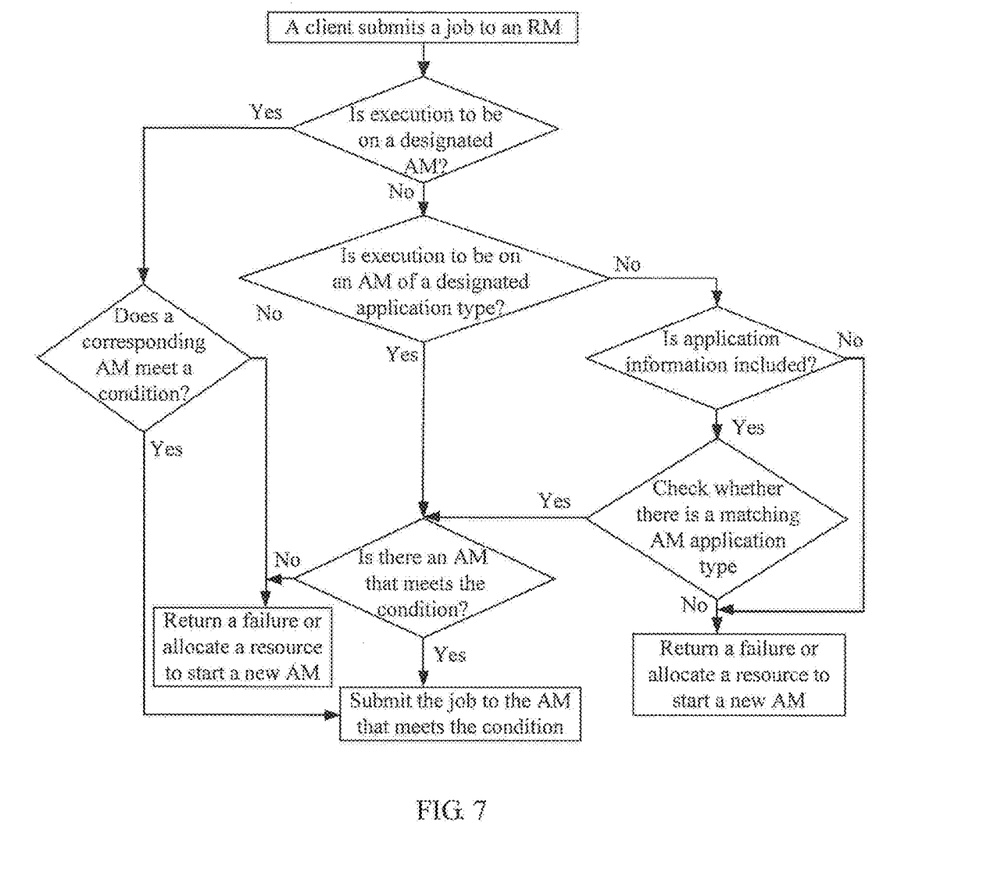
FIG. 7 is a flowchart of Embodiment 3 of the resource management method according to the present disclosure.

FIG. 7 is a flowchart of Embodiment 3 of the resource management method according to the present disclosure. As shown in FIG. 7, on the basis of Embodiment 1 and Embodiment 2, in the method of this embodiment, the checking, in the AMs that have been started in advance, whether there is a matching AM to be used to execute a job, and if there is a matching AM to be used to execute the job, submitting the job to the matching AM for execution may include:

if the information about the job includes executing the job on a designated AM, determining whether the designated AM meets a condition for executing the job, and if the designated AM meets the condition for executing the job, submitting the job to the AM that meets the condition for execution; or  if the information about the job includes executing the job on an AM of a designated application type, determining whether there is an AM that meets a condition in AMs corresponding to the application type, to be used to execute the job, and if there is an AM that meets the condition in AMs corresponding to the application type, submitting the job to the AM that meets the condition for execution; or  if the information about the job includes application information of the job, determining, according to the application information, whether there is a matching AM application type, if there is a matching AM application type, checking whether there is an AM that meets a condition in AMs corresponding to the application type, to be used to execute the job, and if there is an AM that meets the condition in AMs corresponding to the application type, submitting the job to the AM that meets the condition for execution.

As shown in FIG. 7, the client submits the job to the RM. The RM checks, according to the information about the job, whether execution by a designated AM is required. For example, the client has obtained information of all AMs in the AM Pool on the RM before, and has selected a proper AM according to the information about the job and designated the AM when the job is submitted. The RM determines whether the designated AM meets the condition for executing the job, and if the designated AM meets the condition for executing the job, submits the job to the designated AM for execution for execution.

Alternatively, the client submits the job to the RM. The RM checks, according to the information about the job, whether execution by an AM of a designated application type is required. The client has determined in advance, according to the information, about the submitted job, a corresponding application type. The RM determines whether there is an AM that meets the condition in AMs corresponding to the application type, to be used to execute the job, and if there is an AM that meets the condition in AMs corresponding to the application type, submits the job to the AM that meets the condition for execution.

Alternatively, the client submits the job to the RM, and sets, in the job, application information such as resource information. The RM determines, according to the application information, whether there is a matching AM application type, if there is a matching AM application type, checks whether there is an AM that meets the condition in AMs corresponding to the application type, to be used to execute the job, and if there is an AM that meets the condition in AMs corresponding to the application type, submits the job to the AM that meets the condition for execution.

In the foregoing three cases, if a selected AM fails to meet the condition for reasons such as a fault, or if a matching AM is not found, the RM may return a failure to the client, or reselect an AM that meets the requirement for submission or start a new AM.

Optionally, according to a received resource modification request, the RM increases or decreases, the AMs that need to be started in advance; or modifies information about the AMs that need to be started in advance, including modifying resources for starting the AMs that need to be started in advance; or increases or decreases the reserved resources.

An administrator or a user may modify information about AM Pool resources by using a configuration management tool and the like. The RM determines, according to the received resource modification request, whether a modification permission is possessed, and if the modification permission is possessed, determines whether a modification requirement is met. For example, the RM increases or decreases the AMs that need to be started in advance, where, the RM determines, in the case of increase, whether there is a resource to be used for starting an added AM, or skips startup in advance if an AM is not frequently used; or the RM modifies the information about the AMs that need to be started in advance, including modifying the resources for starting the AMs, for example, increasing or decreasing resources for an AM, or modifying an NM node on which an AM is located; or the RM increases or decreases the reserved resources. In all these cases, the RM needs to determine whether the modification requirement is met before modification is performed.

Optionally, after the container completes execution of the task of the job, the method further includes:
  determining whether the container that executes the task of the job needs to be serve as a container of a reserved source; and if the container that executes the task of the job needs to be serve as a container of a reserved source, adding the container that executes the task of the job to the reserved resources; or if the container that executes the task of the job does not need to be serve as a container of a reserved source, removing the container that executes the task of the job and releasing the resource.

After the resource container requested by the AM completes the execution of the task of the job, the RM determines whether the container needs to be serve as a container of a reserved source, and if the container needs to be serve as a container of a reserved source, adds the container to the reserved resources, or if the container does not need to be serve as a container of a reserved source, removes the container and releases the resource.

In this embodiment, for a job submission procedure, the foregoing three cases may apply, that is, submitting the job to a designated AM, submitting the job to an AM of a designated application type, or submitting application information directly for the RM to select a corresponding AM to submit the job to. The RM may further modify resources, for example, increasing or decreasing the AMs that have been started in advance; or modifying the information about the AMs, including modifying the resources for starting the AMs; or increasing or decreasing the reserved resources. After the container that executes the task of the job completes the execution of the task, the RM may further determine, according to configuration, whether to remove the container or add the container to the reserved resources.

Figure 8:
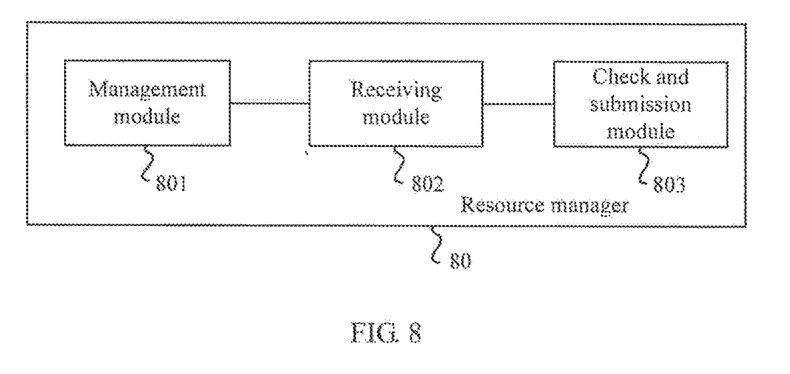
FIG. 8 is a schematic structural diagram of Embodiment 1 of a resource manager according to the present disclosure.

FIG. 8 is a schematic structural diagram of Embodiment 1 of a resource manager according to the present disclosure. As shown in FIG. 8, the resource manager 80 in this embodiment may include: a management module 801 and a check and submission module 803. The management module 801 is configured to: select, according to a type and a quantity of application masters AMs that need to be started in advance, resources from resources registered by a node manager NM, encapsulate the resources into multiple containers matching the AMs that need to be started in advance, and start the AMs that need to be started in advance in the matching containers. The check and submission module 803 is configured to: when a job submitted by a client is received, check, in the AMs that have been started in advance and according to information about the job, whether there is a matching AM to be used to execute the job, and if there is a matching AM to be used to execute the job, submit the job to the matching AM for execution.

Optionally, as shown in FIG. 8, the resource manager 80 further includes a receiving module 802, configured to: after the check and submission module 803 submits the job to the matching AM for execution, receive a source request from the matching AM. Correspondingly, the management module 801 is further configured to:
  allocate a resource registered by the NM, encapsulate the resource into a container, and execute a task of the job in the encapsulated container.

Optionally, the management module 801 is further configured to:
  record information about the AMs that need to be started in advance, where the information includes host names, IP addresses, port numbers, application types and statuses of the AMs that need to be started in advance; and
  the check and submission module 803 is further configured to check whether the AMs that need to be started in advance are in a normal state, where if there is an AM in an abnormal state, the management module 801 is further configured to re-allocate a resource to start the AM that has failed.

The apparatus in this embodiment may be used to execute the technical solution of the method embodiment shown in FIG. 2. Implementation principles and technical effects thereof are similar, and details are not repeatedly described herein.

In Embodiment 2 of the resource manager of the present disclosure, an apparatus of this embodiment is based on the apparatus structure shown in FIG. 8, further, the management module 801 is further configured to:
  before the job submitted by the client is received, reserve resources and encapsulate the reserved resources into multiple containers; and
  the check and submission module 803 is configured to:
  check, in the AMs that have been started in advance and according to the information about the job, whether there is a matching AM to be used to execute the job, and if there is no matching AM to be used to execute the job, determine, according to the information about the job, whether there is a matching container of a reserved resource to be used for starting a new AM to execute the job, where if there is a matching container of a reserved resource to be used for starting a new AM to execute the job, the management module is further configured to allocate the matching container of the reserved resource to start a new AM to execute the job; and if there is a matching AM to be used to execute the job, check, according to the information about the job, whether there is a matching container of a reserved resource to be used for the matching AM to execute a task of the job, where if there is a matching container of a reserved resource to be used for the matching AM to execute the task of the job, the management module is further configured to allocate the matching container of the reserved resource to the AM for executing the task of the job.

The apparatus in this embodiment may be used, to execute the technical solution of Embodiment 2 of the method. Implementation principles and technical effects thereof are similar, and details are not repeatedly described herein.

In Embodiment 3 of the resource manager of the present disclosure, an apparatus of this embodiment is based on the apparatus structure shown in FIG. 8, further, the check and submission module 803 is configured to:

- if the information about the job includes executing the job on a designated AM, determine whether the designated AM meets a condition for executing the job, and if the designated AM meets the condition for executing the job, submit the job to the AM that meets the condition for execution; or
- if the information about the job includes executing the job on an AM of a designated application type, determine whether there is an AM that meets a condition in AMs corresponding to the application type, to be used to execute the job, and if there is an AM that meets the condition in AMs corresponding to the application type, submit the job to the AM that meets the condition for execution; or
- if the information about the job includes application information of the job, determine, according to the application information, whether there is a matching AM application type, if there is a matching AM application type, check whether there is an AM that meets a condition in AMs corresponding to the application type, to be used to execute the job, and if there is an AM that meets the condition in AMs corresponding to the application type, submit the job to the AM that meets the condition for execution.

Optionally, the management module 301 is further configured to:

- according to a received, resource modification request, increase or decrease the AMs that need to be started in advance; or modify information about the AMs that need to be started in advance, including modifying resources for starting the AMs that need to be started in advance; or increase or decrease the reserved resources.

Optionally, the management module 801 is further configured to:

- after the container completes execution of the task of the job, determine whether the container that executes the task of the job needs to be serve as a container of a reserved source; and if the container that executes the task of the job needs to be serve as a container of a reserved source, add the container that executes the task of the job to the reserved resources; or if the container that executes the task of the job does not need to be serve as a container of a reserved source, remove the container that executes the task of the job and release the resource.

The apparatus in this embodiment may be used to execute the technical solution of the method embodiment shown in FIG. 7. Implementation principles and technical effects thereof are similar, and details are not repeatedly described herein.

Figure 9:
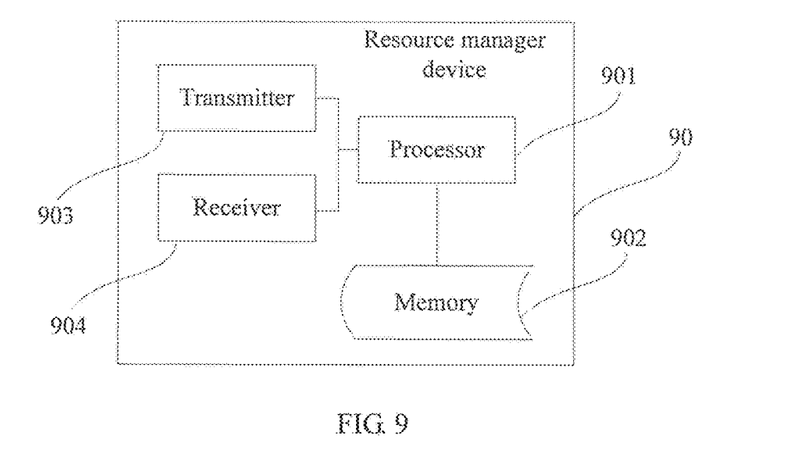
FIG. 9 is a schematic structural diagram of Embodiment 1 of a resource manager device according to the present disclosure.

FIG. 9 is a schematic structural diagram of Embodiment 1 of a resource manager device according to the present disclosure. As shown in FIG. 9, the resource manager device 90 provided in this embodiment of the present disclosure includes a processor 901 and a memory 902. The resource manager device 90 may further include a transmitter 903 and a receiver 904. The transmitter 903 and a receiver 904 may be connected to the processor 901. The transmitter 903 is configured to send data or information, the receiver 904 is configured to receive data or information, and the memory 902 stores an executable instruction. When the resource manager device 90 runs, the processor 901 communicates with the memory 902, and the processor 901 invokes the executable instruction in the memory 902 to execute the technical solution of any method embodiment. Implementation principles and technical effects thereof are similar, and details are not repeatedly described herein.

In the several embodiments provided in the present application, it should be understood that the disclosed device and method may be implemented in other manners. For example, the described device embodiments are merely exemplary. For example, the unit or module division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented by using some interfaces. The indirect couplings or communication connections between the devices or modules may be implemented in electronic, mechanical, or other forms.

The modules described as separate parts may or may not be physically separate, and parts displayed as modules may or may not be physical modules, and may be located in one position, or may be distributed on a plurality of network units. Some or all of the modules may be selected according to actual requirements to achieve the objectives of the solutions of the embodiments.

Persons of ordinary skill in the art may understand that all or some of the steps of the method embodiments may be implemented by a program instructing relevant hardware. The program may be stored in a computer-readable storage medium, when the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A resource management method, comprising:
   selecting, by a resource manager (RM) of a Hadoop YARN system, according to a type and a quantity of application masters (AMs) of the Hadoop YARN system that are to be started in advance, first resources from resources registered by a node manager (NM), wherein the AMs that are to be started in advance are to be started prior to receiving a job from a client by the RM;
   encapsulating the first resources into multiple containers matching the AMs that are to be started in advance;

starting the AMs that are to be started in advance in the matching containers;

checking, in the AMs that have been started in advance and according to information about the job received from the client, whether there is a matching AM to be used to execute the job, when the RM receives the job;

when there is a matching AM to be used to execute the job, submitting the job to the matching AM for execution;

recording, by the RM, information about the AMs that are to be started in advance, wherein the information comprises host names, IP addresses, port numbers, application types and statuses of the AMs that are to be started in advance; and checking, by the RM, whether the AMs that are to be started in advance are in a normal state, and if there is an AM in an abnormal state among the AMs that are to be started in advance, reallocating a resource to start the AM that is in the abnormal state which is an AM that has failed.

2. The method according to claim 1, wherein after submitting the job to the matching AM for execution, the method further comprises:

receiving, by the RM, a resource request from the matching AM, allocating at least one of the resources registered by the NM, encapsulating the at least one resource into a container, and executing a task of the job in the encapsulated container.

3. The method according to claim 1, wherein:

before the RM receives the job submitted by the client, the method further comprises:

reserving, by the RM, resources and encapsulating the reserved resources into multiple containers; and the method further comprises:

determining, by the RM, according to the information about the job, whether there is a matching container of a reserved resource to be used for starting a new AM to execute the job, when there is no matching AM to be used to execute the job; and allocating the matching container of the reserved resource to start the new AM to execute the job, when there is a matching container of a reserved resource to be used for starting a the new AM to execute the job.

4. The method according to claim 1, wherein:

before the RM receives the job submitted by the client, the method further comprises:

reserving, by the RM, resources and encapsulating the reserved resources into multiple containers; and the method further comprises:

checking, by the RM, according to the information about the job, whether there is a matching container of a reserved resource to be used for the matching AM to execute a task of the job, when there is a matching AM to be used to execute the job; and allocating the matching container of the reserved resource to the AM for executing the task of the job, when there is a matching container of a reserved resource to be used for the matching AM to execute the task of the job.

5. The method according to claim 1, wherein the information about the job comprises information about executing the job on a designated AM, or information about executing the job on an AM of a designated application type, or application information of the job.

6. The method according to claim 3, wherein after the container completes execution of a task of the job, the method further comprises:

determining whether the container that executes the task of the job needs to serve as a container of a reserved source;

if the container that executes the task of the job needs to serve as a container of a reserved source, adding the container that executes the task of the job to the reserved resources; and if the container that executes the task of the job does not need to serve as a container of a reserved source, removing the container that executes the task of the job and releasing the resource.

7. The method according to claim 4, wherein after the container completes execution of the task of the job, the method further comprises:

determining whether the container that executes the task of the job needs to serve as a container of a reserved source;

if the container that executes the task of the job needs to serve as a container of a reserved source, adding the container that executes the task of the job to the reserved resources; and if the container that executes the task of the job does not need to serve as a container of a reserved source, removing the container that executes the task of the job and releasing the resource.

8. A resource manager of a Hadoop YARN system, the resource manager comprising:

a memory, configured to store executable instructions;

a processor configured, when executing the executable instructions in the memory, to:

select, according to a type and a quantity of application masters (AMs) of the Hadoop YARN system that are to be started in advance, first resources from resources registered by a node manager (NM), wherein the AMs that are to be started in advance are to be started prior to receiving a job from a client by the resource manager;

encapsulate the first resources into multiple containers matching the AMs that are to be started in advance;

start the AMs that are to be started in advance in the matching containers;

check, in the AMs that have been started in advance and according to information about the job received from the client, whether there is a matching AM to be used to execute the job, when the job is received;

when there is a matching AM to be used to execute the job, submit the job to the matching AM for executions;

record information about the AMs that are to be started in advance, wherein the information comprises host names, IP addresses, port numbers, application types and statuses of the AMs that are to be started in advance; and check whether the AMs that are to be started in advance are in a normal state, and if there is an AM in an abnormal state among the AMs that are to be started in advance, re-allocate a resource to start the AM that is in the abnormal state which is an AM that has failed.

9. The resource manager according to claim 8, wherein the processor is further configured to:

receive a resource request from the matching AM;

allocate at least one of the resources registered by the NM;

encapsulate the at least one resource into a container; and execute a task of the job in the encapsulated container.

10. The resource manager according to claim 8, wherein the processor is further configured to:

reserve resources and encapsulate the reserved resources into multiple containers before the job submitted by the client is received; and determine, according to the information about the job, whether there is a matching container of a reserved resource to be used for starting a new AM to execute the job, when there is no matching AM to be used to execute the job; and allocate the matching container of the reserved resource to start the new AM to execute the job, when there is a matching container of a reserved resource to be used for starting the new AM to execute the job.

11. The resource manager according to claim 8, wherein the processor is further configured to:

reserve resources and encapsulate the reserved resources into multiple containers before the job submitted by the client is received; and check, according to the information about the job, whether there is a matching container of a reserved resource to be used for the matching AM to execute a task of the job, when there is a matching AM to be used to execute the job; and allocate the matching container of the reserved resource to the AM for executing the task of the job, when there is a matching container of a reserved resource to be used for the matching AM to execute the task of the job.

12. The resource manager according to claim 8, wherein the information about the job comprises: information about executing the job on a designated AM, or information about executing the job on an AM of a designated application type, or application information of the job.

13. The resource manager according to claim 10, wherein the processor is further configured to:

determine whether the container that executes a task of the job needs to serve as a container of a reserved source, after the container completes execution of the task of the job;

if the container that executes the task of the job needs to serve as a container of a reserved source, add the container that executes the task of the job to the reserved resources; and if the container that executes the task of the job does not need to serve as a container of a reserved source, remove the container that executes the task of the job and release the resource.

14. The resource manager according to claim 11, wherein the processor is further configured to:

determine whether the container that executes the task of the job needs to serve as a container of a reserved source, after the container completes execution of the task of the job;

if the container that executes the task of the job needs to serve as a container of a reserved source, add the container that executes the task of the job to the reserved resources; and if the container that executes the task of the job does not need to serve as a container of a reserved source, remove the container that executes the task of the job and release the resource.

* * * * *